(12) United States Patent
Huang et al.

(10) Patent No.: US 8,489,927 B2
(45) Date of Patent: Jul. 16, 2013

(54) DEVICE FOR USE IN INSPECTING A CPU AND METHOD THEREOF

(75) Inventors: Chun-Jieh Huang, Hsinchu (TW); Huan-Chau Lin, Hsinchu (TW); Chang Cheng Yap, Hsinchu (TW)

(73) Assignee: RDC Semiconductor Co., Ltd., Hsinchu (TW)

( * ) Notice: Subject to any disclaimer, the term of this patent is extended or adjusted under 35 U.S.C. 154(b) by 306 days.

(21) Appl. No.: 12/968,565

(22) Filed: Dec. 15, 2010

(65) Prior Publication Data

US 2011/0246838 A1    Oct. 6, 2011

(30) Foreign Application Priority Data

Mar. 31, 2010  (TW) ................................ 99109873 A

(51) Int. Cl.
*G06F 11/00* (2006.01)
(52) U.S. Cl.
USPC .............................................. 714/37; 714/10

(58) Field of Classification Search
None
See application file for complete search history.

(56) References Cited

U.S. PATENT DOCUMENTS

| | | | | |
|---|---|---|---|---|
| 6,622,264 | B1* | 9/2003 | Bliley et al. ...................... | 714/26 |
| 6,634,000 | B1* | 10/2003 | Jammu et al. .................... | 714/37 |
| 2003/0084273 | A1* | 5/2003 | Moore .......................... | 712/227 |
| 2011/0029818 | A1* | 2/2011 | Saito .............................. | 714/37 |

* cited by examiner

*Primary Examiner* — Christopher McCarthy
(74) *Attorney, Agent, or Firm* — Skaar Ulbrich Macari, P.A.

(57) ABSTRACT

A device for use in inspecting a CPU and a method thereof are provided. The device comprises a receiving interface and a processor. The receiving interface receives a first data stream from the CPU when the CPU executes a reference hardware inspection program in a first time interval, and receives a second data stream from the CPU when the CPU executes the reference hardware inspection program in a second time interval. The processor sets the first data stream as a good log, and sets the second data stream as an erroneous log. The processor compares the good log and the erroneous log to determine a segment of the erroneous log as an erroneous range, and determine a defect of the CPU according to the erroneous range.

28 Claims, 4 Drawing Sheets

DEVICE FOR USE IN INSPECTING A CPU AND METHOD THEREOF

RELATED APPLICATION

This application claims priority to Taiwan Patent Application No. 099109873 filed on Mar. 31, 2010.

BACKGROUND OF THE INVENTION

1. Field of the Invention

The present invention relates to a device for use in inspecting a central processing unit (CPU) and a method thereof. More specifically, the device and the method thereof in accordance with the present invention detect a defect of a CPU by enabling the CPU to repeatedly execute a reference hardware inspection program to generate a good log and an erroneous log and then comparing the good log with the erroneous log.

2. Descriptions of the Related Art

With development of science and technology, computers have become a kind of indispensable tool to people's daily life. As a main component of a computer, quality of a central processing unit (CPU) has a direct influence on performance of the operating system of the computer. Additionally, as the operating system programs get increasingly diversified, the CPU must be designed to execute various operating system programs with optimized performance so as to add to the market value thereof.

Generally, in order to have the CPU execute an operating system program normally, a usual practice in the art is to employ expensive hardware facilities to detect for any defect of the CPU by using the hardware facilities to access the CPU directly. Hence, a manufacturer having more expensive hardware facilities will be able to detect defects of a CPU more effectively and, thus, have a higher chance to design a CPU with high performance and stability. As a result, costs associated with the expensive hardware facilities will be reflected directly in the sale price of the CPU, and the CPU market tends to be monopolized by only a few manufacturer giants.

Furthermore, the operating system programs consist of huge and complex program assemblies, so it is unlike a common small customized hardware error inspection program which can simulate and detect for errors in an electronic design automation (EDA) tool. Therefore, with the complex and huge operating system programs, how to simulate only parts, where an error occurs when being executed by the CPU, of the operating system programs in the EDA tool for detecting a defect of the CPU becomes very important.

Accordingly, an urgent need exists in the art to provide a solution capable of detecting a defect of a CPU in an effective but economical way so as to reduce the complexity and minimize the cost associated with the detection.

SUMMARY OF THE INVENTION

In view of the problems confronted by the prior art, an objective of the present invention is to provide a device for use in inspecting a CPU and a method thereof. The device enables the CPU to repeatedly execute a reference hardware inspection program (e.g., an operating system program) to generate a good log and an erroneous log and determines an erroneous range by comparing the good log with the erroneous log to find a defect of the CPU according to the erroneous range. As a result, the device and the method thereof according to the present invention can preliminarily determine an erroneous range of the CPU in a less complex but efficient way and then find a defect of the CPU within the erroneous range, thereby to decrease both the time and the cost necessary for detecting the defect of the CPU.

To achieve the aforesaid objective, the device of the present invention comprises a receiving interface and a processor. The device is electrically connected to the CPU. The receiving interface is configured to receive a first data stream from the CPU when the CPU executes a reference hardware inspection program in a first time interval, and receive a second data stream from the CPU when the CPU executes the reference hardware inspection program in a second time interval. The processor is configured to set the first data stream as a good log and set the second data stream as an erroneous log. Further, the processor is configured to compare the good log with the erroneous log to determine a segment of the erroneous log as an erroneous range and determine a defect of the CPU according to the erroneous range.

Further, a method adapted for the device is further disclosed in the present invention, which comprises the following steps of: (a) enabling the receiving interface to receive a first data stream from the CPU when the CPU executes a reference hardware inspection program in a first time interval; (b) enabling the processor to set the first data stream as a good log; (c) enabling the receiving interface to receive a second data stream from the CPU when the CPU executes the reference hardware inspection program in a second time interval; (d) enabling the processor to set the second data stream as an erroneous log; (e) enabling the processor to compare the good log with the erroneous log to determine a segment of the erroneous log as an erroneous range; and (f) enabling the processor to determine a defect of the CPU according to the erroneous range.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a device for use in inspecting a CPU and a method thereof. According to the device and the method of the present invention, a reference hardware inspection program is repeatedly executed by the CPU to generate a good log and an erroneous log, and an erroneous range is determined by comparing the good log with the erroneous log to find a defect of the CPU according to the erroneous range. Description of the following embodiments is only for purpose of illustration rather than to limit the scope of the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
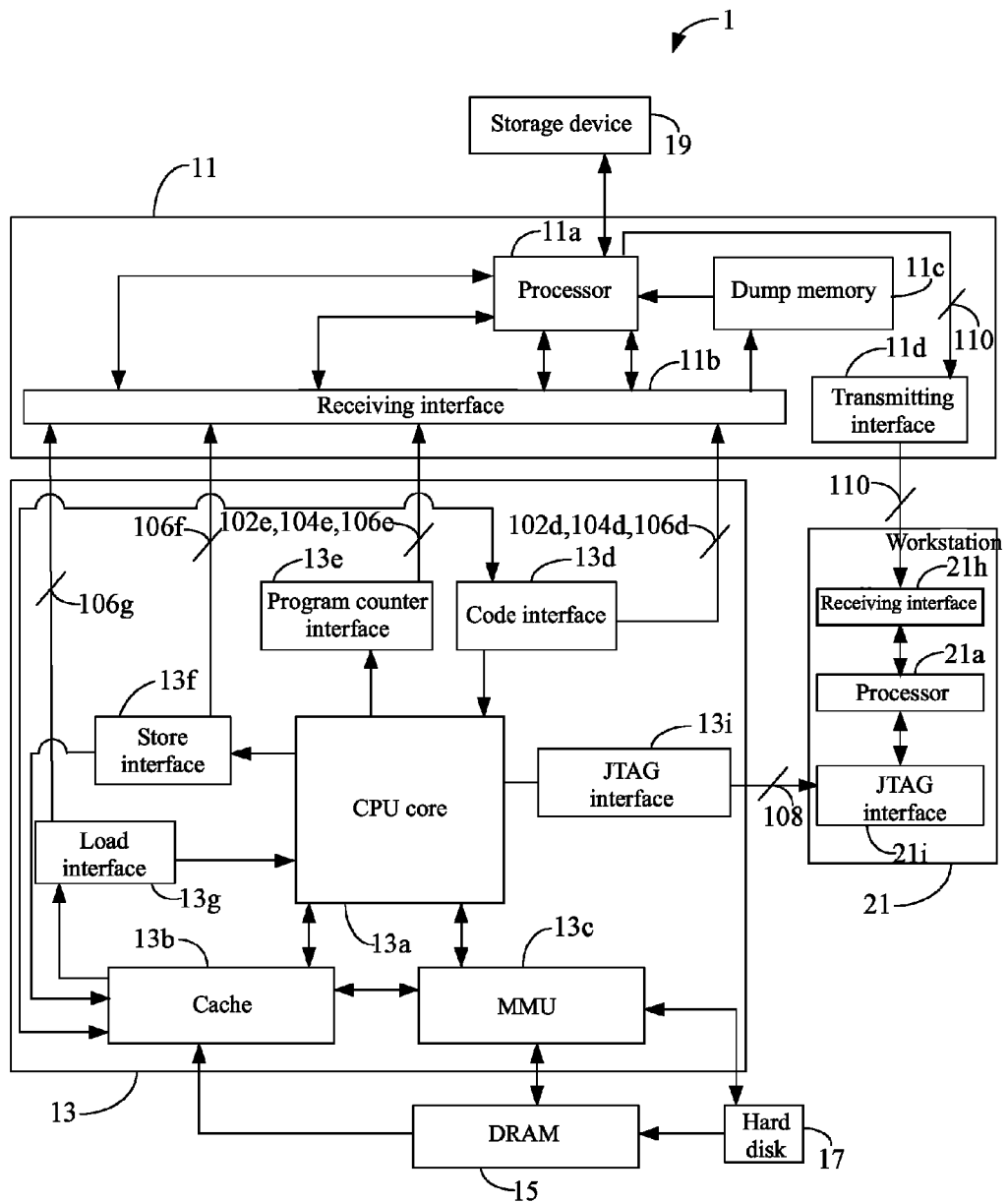
FIG. 1 is a schematic view illustrating operational concepts of an inspection platform of a first and a second embodiment of the present invention.

As shown in FIG. 1, an inspection platform 1 of the present invention is shown therein. The inspection platform 1 comprises a device 11 for use in inspecting a CPU (referred to as the inspection device 11 hereinafter), a CPU 13, a dynamic random access memory (DRAM) 15, a hard disk 17, a storage device 19 and a workstation 21. The inspection device 11 is electrically connected to the CPU 13. A reference hardware inspection program is stored in the hard disk 17. The CPU 13 is electrically connected to the DRAM 15 and the hard disk 17, and is an environment of a field-programmable gate array (FPGA). The inspection device 11 comprises a processor 11a, a receiving interface 11b, a dump memory 11e and a transmitting interface 11d. The storage device 19 may be a hard disk, a rewritable optical disk (CD), a mobile disk or one of other devices with storage functionality, although it is not merely limited thereto.

The CPU 13 comprises a CPU core 13a, a cache 13b, a memory management unit (MMU) 13c, a code interface 13d, a program counter interface 13e, a store interface 13f, a load interface 13g and a joint test action group (JTAG) interface 13i. The workstation 21, which is an environment for implementing an electronic design automation (EDA) tool, comprises a processor 21a, a receiving interface 21h and a JTAG interface 21i.

The CPU core 13a is configured to load the reference hardware inspection program into the cache 13b and the DRAM 15 to execute the reference hardware inspection program. When the CPU core 13a executes the reference hardware inspection program, an address mapping relationship of the reference hardware inspection program among the cache 13b, the DRAM 15 and the hard disk 17 is recorded by the MMU 13c. Additionally, code address information is recorded by the CPU core 13a into a counter register via the program counter interface 13e. According to the code address information transmitted by the code interface 13d, code information is read by the CPU core 13a from the cache 13b. Then, the CPU core 13a writes calculated data into the cache 13b via the storage interface 13f or reads data to be calculated from the cache 13b via the load interface 13g. Detailed operations of the program counter interface 13e, the code interface 13d, the store interface 13f and the load interface 13g are well known in the prior art and are not technical features of the present invention, so they will not be further described herein.

The receiving interface 11b of the inspection device 11 is electrically connected to the code interface 13d, the program counter interface 13e, the store interface 13f and the load interface 13g of the CPU 13, for example, in the connection way illustrated in FIG. 1. The CPU 13 may be designed to operate in different modes when executing the reference hardware inspection program in different time intervals. The inspection device 11 may receive a plurality of data streams, which is generated as a result of the execution of the reference hardware inspection program by the CPU core 13a, via the receiving interface 11b from the code interface 13d, the program counter interface 13e, the storage interface 13f and the load interface 13g, and detect a defect caused by a poor hardware design of the CPU 13 itself according to the plurality of data streams. In this embodiment, the reference hardware inspection program may be an operating system program (e.g., the Linux operating system or the Microsoft operating system); however, in other embodiments, the reference hardware inspection program may also be any of other huge and complex programs.

The inspection platform 1 of the present invention is configured to inspect a defect of the CPU 13. When the CPU 13 executes the reference hardware inspection program in a first time interval, the receiving interface 11b of the inspection device 11 receives a first data stream from the CPU 13; and when the CPU 13 executes the reference hardware inspection program in a second time interval, the receiving interface 11b of the inspection device 11 receives a second data stream from the CPU 13. Then, the processor 11a of the inspection device 11 sets the first data stream as a good log, sets the second data stream as an erroneous log, determines a segment of the erroneous log as an erroneous range by comparing the good log with the erroneous log, and determines a defect of the CPU 13 according to the erroneous range.

Further speaking, when it is desired to test different kinds of defects of the CPU 13, the receiving interface 11b of the inspection device 11 receives the first and the second data streams of different kinds from different interfaces of the CPU 13. The inspection platform 1 of the present invention may be particularly used to inspect defects in terms of memory data accessing and calculation and transmission defects in terms of the pipeline structure of the CPU 13. However, it shall be particularly noted that, the inspection platform 1 of the present invention may also be used to inspect other structural defects of the CPU 13, and it is believed that those of ordinary skill in the art may readily appreciate examples in which the inspection platform 1 is used to inspect other structural defects of the CPU upon reviewing description of the following embodiments in this specification, so this will not be further described in the following description.

The first embodiment of the present invention describes that the inspection platform 1 is configured to inspect a defect of the CPU 13 in terms of memory data accessing. In this embodiment, the reference hardware inspection program may be a complete operating system program or a huge and complex inspection program, and comprises codes for instructing the CPU 13 to access the cache 13b and codes for instructing the CPU 13 to read data into the cache 13b from the DRAM 15 or the hard disk 17 via the MMU 13c in various operating systems. Hereinbelow, details of how the inspection device 11 inspects the CPU 13 will be further described.

When the CPU executes the reference hardware inspection program in a first time interval, the receiving interface 11b of the inspection device 1 receives a first code data stream 102d included in a first data stream from the code interface 13d. Then, the processor 11a stores the first code data stream 102d into the storage device 19 at first. After the CPU core 13a has completed execution of the reference hardware inspection program, the processor 11a determines whether an error message is generated by the CPU 13 as a result of the execution of the reference hardware inspection program. If no error message is generated when the CPU 13 executes the reference hardware inspection program in the first time interval, then the processor 11a sets the first code data stream 102d as a good log.

When the CPU executes the reference hardware inspection program in a second time interval, the receiving interface 11b of the inspection device 1 receives a second code data stream 104d included in a second data stream from the code interface 13d. Then, the processor 11a stores the second code data stream 104d into the storage device 19 at first. During a process when the CPU core 13a executes the reference hardware inspection program, the processor 11a determines whether an error message is generated by the CPU 13 as a result of the execution of the reference hardware inspection program. If an error message is generated by the CPU 13 when executing the reference hardware inspection program in the second time interval, then the processor 11a sets the second code data stream 104d as an erroneous log. Since it is likely that the CPU 13 fails to execute the reference hardware inspection program completely (i.e., interrupts execution of the reference hardware inspection program) due to a poor hardware design of itself, the processor 11a may ascertain generation of the error message as soon as the CPU 13 interrupts the execution of the reference hardware inspection program. In other words, the processor 11a may, after the CPU 13 interrupts or completes the execution of the reference hardware inspection program, determine whether an error message is generated by the CPU 13 as a result of the execution of the reference hardware inspection program. Furthermore, in this embodiment, the good log represents a correct operation log, while the erroneous log represents a problem operation log. It shall be appreciated that, the words "first" and "second" used in the terms "the first time interval" and "the second time interval" are only used to differentiate the two time intervals from each other, but not to imply a precedence sequence.

Subsequently, the processor 11a reads the good log and the erroneous log from the storage device 19, compares the second code data stream 104d representing the erroneous log with the first code data stream 102d representing the good log, and determines a segment where the second code data stream 104d is different from the first code data stream 102d as an erroneous range. Further speaking, since each of the first code data stream 102d and the second code data stream 104d contains a plurality of code data respectively, the processor 11a compares the code data in a sequential manner. Furthermore, the processor 11a determines the segment where the first code data stream 102d and the second code data stream 104d are different from each other as the erroneous range. Then, the processor 11a determines a candidate code range of the reference hardware inspection program according to the erroneous range, in which a plurality of codes of the candidate code range is configured to access a plurality of linear addresses of the hard disk 17.

Once the erroneous range is determined, when the CPU core 13a executes the reference hardware inspection program again in a third time interval (referred to as the third execution hereinafter), the CPU core 13a loads the reference hardware inspection program into the DRAM 15 and the cache 13b anew to execute the reference hardware inspection program. While the CPU core 13a is executing the reference hardware inspection program, the MMU 13c records an address mapping relationship of the reference hardware inspection program among the cache 13b, the DRAM 15 and the hard disk 17. Meanwhile, the receiving interface 11b receives the data stored in the linear addresses of the hard disk 17 from the code interface 13d, and the dump memory 11c further receives from the receiving interface 11b and stores the data.

Afterwards, when the CPU core 13a executes one of the codes again to access a candidate linear address, the processor 11a retrieves a first predetermined portion of the data corresponding to the candidate linear address from the cache 13b as a first data. The candidate linear address is one of the linear addresses. Then, the processor 11a retrieves a second predetermined portion of the data corresponding to the candidate linear address from the dump memory 11c as a second data.

The first predetermined portion and the second predetermined portion described above must be identical. As an example, when the first predetermined portion is a whole of the data corresponding to the linear address stored in the cache 13b, the second predetermined portion is a whole of the data 106 corresponding to the linear address stored in the dump memory 11e. As another example, the first predetermined portion may be a plurality of bits of the data corresponding to the linear address stored in the cache 13b, the second predetermined portion may be a plurality of bits of the data corresponding to the linear address stored in the dump memory 11e, and amounts and positions of the bits of the first predetermined portion and the second predetermined portion are the same (e.g., the least significant bits (LSBs) or the most significant bits (MSBs) among 256 bits).

Thereafter, the processor 11a determines whether the first data and the second data are identical to each other. If the determination result is that the first data and the second data are not identical, the processor 11a determines that the code for accessing the candidate linear address is related to the defect of the CPU 13. Then, when execution of the reference hardware inspection program by the CPU core 13a in a fourth time interval reaches the candidate code range, the receiving interface 11b receives an interval code data stream 106d, an interval counter data stream 106e, an interval store data stream 106f and an interval load data stream 106g from the code interface 13d, the program counter interface 13e, the store interface 13f and the load interface 13g respectively. Additionally, when execution of the reference hardware inspection program by the CPU core 13a in the fourth time interval reaches the candidate code range, the workstation 21 also receives a working status 108 of the CPU core (i.e., a status of the CPU core 13a and a status of registers thereof) from the JTAG interface 13i of the CPU 13 via the JTAG interface 21i thereof.

Then, the processor 11a converts the interval code data stream 106d, the interval counter data stream 106e, the interval store data stream 106f and the interval load data stream 106g into a problem interval log 110 which is readable by a workstation, and transmits the problem interval log 110 to the workstation 21 via the transmitting interface 11d. Upon receiving the problem interval log 110 via the receiving interface 21h thereof, the workstation 21 simulates the operation status of the CPU 13 within the erroneous range according to the working status 108 and the problem interval log 110 to determine the defect of the CPU 13.

As can be known from the above description, by comparing the data stored in the cache 13b with that stored in the dump memory 11c, it can be ascertained that the erroneous range is related to the defect of the MMU 13c of the CPU 13, and then by simulating the operation status of the CPU 13 within the erroneous range by use of the workstation 21, the defect of the MMU 13c can be found exactly.

A second embodiment of the present invention describes that the inspection platform 1 is configured to inspect calculation and transmission defects in terms of the pipeline structure of the CPU 13. Unlike the first embodiment, when the CPU core executes the reference hardware inspection program in this embodiment, the receiving interface 11b reads data streams from the program counter interface 13e as a good log and an erroneous log. Similarly, in the second embodiment, the reference hardware inspection program may be a complete operating system program or a huge and complex inspection program, and comprises codes for calculation and transmission in the pipeline structure in various operating systems.

Specifically, when the CPU core 13a executes the reference hardware inspection program in a first time interval, the receiving interface 11b receives a first counter data stream 102e included in the first data stream from the program counter interface 13e. Then, the processor 11a stores the first counter data stream 102e into the storage device 19. After the CPU 13 has completed execution of the reference hardware inspection program, the processor 11a determines whether an error message has been generated by the CPU 13 as a result of the execution of the reference hardware inspection program in the first time interval. If it is determined that no error message has been generated as a result of the execution of the reference hardware inspection program in the first time interval by the CPU 13, then the processor 11a sets the first counter data stream 102e as a good log.

On the other hand, when the CPU core 13a executes the reference hardware inspection program in a second time interval, the receiving interface 11b receives a second counter data stream 104e from the program counter interface 13e. Then, the processor 11a stores the second counter data stream 104e into the storage device 19. Likewise, the processor 11a determines whether an error message has been generated by the CPU 13 when executing the reference hardware inspection program in the second time interval. If it is determined by the processor 11a that an error message has been generated by the CPU 13 as a result of the execution of the reference hardware inspection program in the second time interval, then the processor 11a sets the second counter data stream 104e as an erroneous log. It shall be appreciated that, the words "first" and "second" used in the terms "the first time interval" and "the second time interval" are only used to differentiate the two time intervals from each other, but not to imply a precedence sequence.

Subsequently, the processor 11a reads the good log and the erroneous log from the storage device 19, and compares the second counter data stream 104e representing the erroneous log with the first counter data stream 102e representing the good log. Further speaking, since each of the first counter data stream 102e and the second counter data stream 104e contains a plurality of counter data respectively, the processor 11a compares the counter data in a sequential manner. The processor 11a determines a segment where the second counter data stream 104e is different from the first counter data stream 102e as an erroneous range; i.e., the processor 11a views the segment where the first counter data stream 102e and the second counter data stream 104e are different as the erroneous range.

Then, the processor 11a determines a candidate code range of the reference hardware inspection program according to the erroneous range. The candidate code range is related to calculation and transmission in the pipeline structure. Afterwards, when execution of the reference hardware inspection program by the CPU core 13a in a third time interval reaches the candidate code range, the receiving interface 11b receives an interval code data stream 106d, an interval counter data stream 106e, an interval store data stream 106f and an interval load data stream 106g from the code interface 13d, the program counter interface 13e, the store interface 13f and the load interface 13g respectively. Additionally, when execution of the reference hardware inspection program by the CPU core 13a in the third time interval reaches the candidate code range, the workstation 21 also receives a working status 108 of the CPU core (i.e., a status of the CPU core 13a and a status of registers thereof) from the JTAG interface 13i of the CPU 13 via the JTAG interface 21i thereof.

Then, the processor 11a converts the interval code data stream, the interval counter data stream, the interval store data stream and the interval load data stream into a problem interval log 110 which is readable by a workstation, and transmits the problem interval log 110 to the workstation 21 via the transmitting interface 11d. Upon receiving the problem interval log 110 via the receiving interface 21h thereof, the workstation 21 simulates the operation status of the CPU 13 within the erroneous range according to the working status 108 and the problem interval log 110 to determine the defect of the CPU 13.

It shall be particularly noted that, apart from inspecting defects in terms of memory data accessing and defects in terms of calculation and transmission in the pipeline structure of the CPU 13 respectively as described in the first embodiment and the second embodiment, the inspection platform 1 of the present invention may also inspect defects of multiple levels of the CPU 13 in a single inspection process. It is believed that how this is accomplished will be readily appreciated by those of ordinary skill in the art and, thus, will not be further described herein.

Figure 2A:
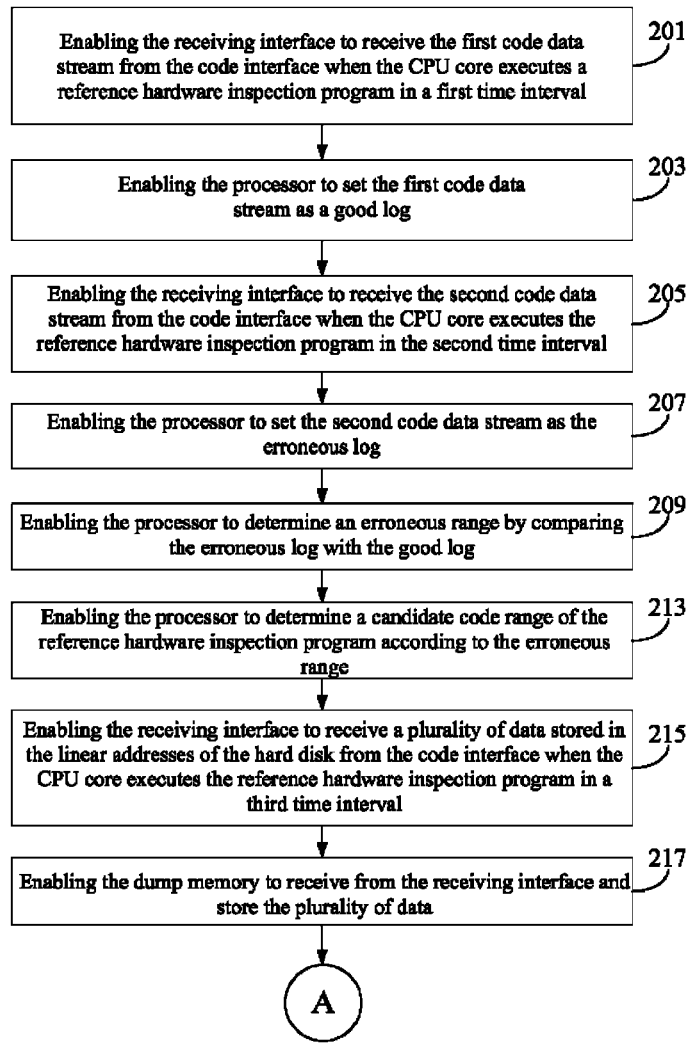
FIGS. 2A-2B illustrate a flowchart of a method for an inspection device of the present invention, which is adapted for the inspection device of the first embodiment.
Figure 2B:
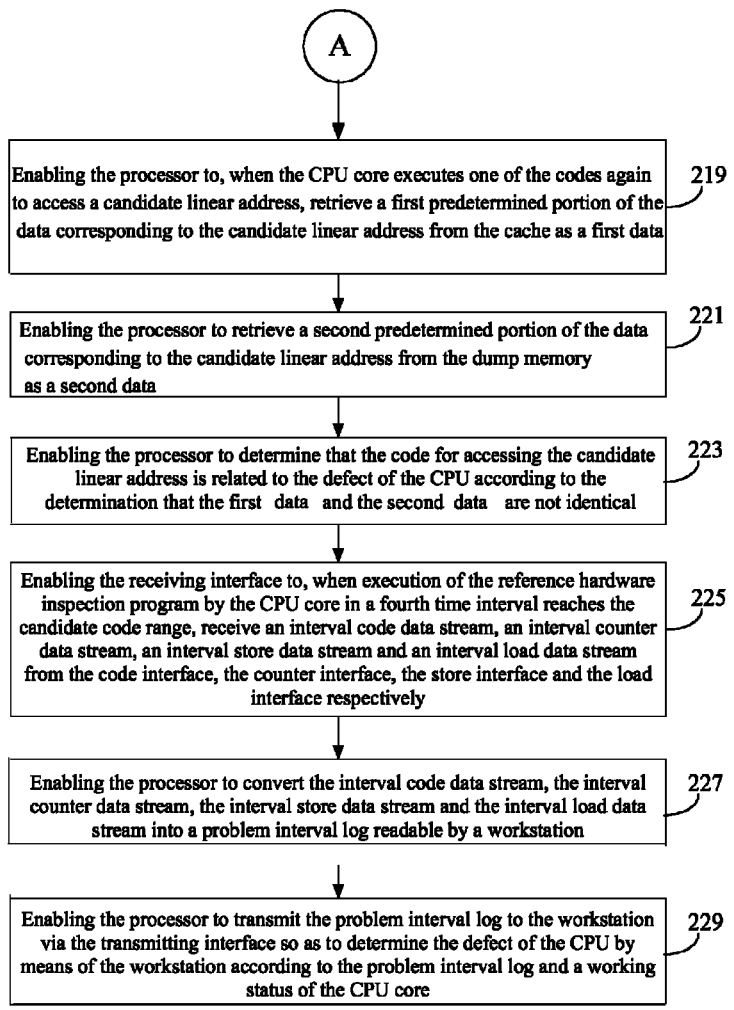

A third embodiment of the present invention is a method for inspecting a CPU, a flowchart of which is shown in FIGS. 2A and 2B. The method of the third embodiment may be adapted for the inspection device of the present invention (e.g., the inspection device 11 of the first embodiment). The inspection device comprises a processor, a receiving interface, a dump memory and a transmitting interface. The CPU comprises a CPU core, a cache, an MMU, a code interface, a program counter interface, a store interface, a load interface and a JTAG interface. The CPU is electrically connected to a DRAM, a dump memory and a hard disk.

Initially, step 201 is executed to enable the receiving interface to receive the first code data stream from the code interface when the CPU core executes a reference hardware inspection program in a first time interval. Then, step 203 is executed to enable the processor to store the first code data stream into a storage device and, after the CPU core has completed execution of the reference hardware inspection program, determine that an error message is not generated by the CPU as a result of the execution of the reference hardware inspection program and set the first code data stream as a good log. Next, step 205 is executed to enable the receiving interface to receive the second code data stream from the code interface when the CPU core executes the reference hardware inspection program in the second time interval. Afterwards, step 207 is executed to enable the processor to store the second code data stream into the storage device and, while the CPU core is executing the reference hardware inspection program, determine that an error message is generated by the CPU as a result of the execution of the reference hardware inspection program and set the second code data stream as the erroneous log. The good log is a correct operation log, while the erroneous log is a problem operation log. It shall be appreciated that, the steps 201 and 203 may be swapped with the steps 205 and 207; and depending on whether an error occurs during the execution of the reference hardware inspection program by the CPU, a log corresponding to a case where no error occurs is recorded as a good log, while a log corresponding to a case where an error occurs is recorded as an erroneous log.

Afterwards, step 209 is executed to enable the processor to read the good log and the erroneous log from the storage device, and by comparing the second code data stream representing the erroneous log with the first code data stream representing the good log in a sequential manner, determine a segment where the second code data stream is different from the first code data stream as an erroneous range.

Then, step 213 is executed to enable the processor to determine a candidate code range of the reference hardware inspection program according to the erroneous range, wherein a plurality of codes of the candidate code range are configured to access a plurality of linear addresses of the hard disk. To further determine that the defect of the CPU is related to the codes of the candidate code range accessing the linear addresses of the hard disk, step 215 is executed to enable the receiving interface to receive a plurality of data stored in the linear addresses of the hard disk from the code interface when the CPU core is executing the reference hardware inspection program in a third time interval. Thereafter, step 217 is executed to enable the dump memory to receive from the receiving interface and store the plurality of data. Next, step 219 is executed to enable the processor to, when the CPU core executes one of the codes again to access a candidate linear address, retrieve from the cache a first predetermined portion of the data corresponding to the candidate linear address as a first data, wherein the candidate linear address is one of the linear addresses. Afterwards, step 221 is executed to enable the processor to retrieve from the dump memory a second predetermined portion of the data corresponding to the candidate linear address as a second data.

Thus, if it is determined that the first data and the second data are not identical to each other, the processor can determine in step 223 that the code for accessing the candidate linear address is related to the defect of the CPU. Accordingly, the processor can preliminarily determine that an error might be generated by the CPU when executing the access code related to the candidate linear address.

Then, in order to surely ascertain the defect of the CPU, step 225 is executed to enable the receiving interface to, when execution of the reference hardware inspection program by the CPU core in a fourth time interval reaches the candidate code range, receive an interval code data stream, an interval counter data stream, an interval store data stream and an interval load data stream from the code interface, the counter interface, the store interface and the load interface respectively. Meanwhile, when the execution of the reference hardware inspection program by the CPU core in the fourth time interval reaches the candidate code range, the workstation also receives a working status of the CPU core (i.e., a status of the CPU core and a status of registers thereof) via the JTAG interface. Next, step 227 is executed to enable the processor to convert the interval code data stream, the interval counter data stream, the interval store data stream and the interval load data stream into a problem interval log which is readable by a workstation. Finally, step 229 is executed to enable the processor to transmit the problem interval log to the workstation via the transmitting interface so as to determine the defect of the CPU by means of the workstation according to the problem interval log and the working status.

In addition to the aforesaid steps, the method of this embodiment can also execute all the operations and functions set forth in the first embodiment. How the method of this embodiment executes these operations and functions will be readily appreciated by those of ordinary skill in the art based on the explanation of the first embodiment and, thus, will not be further described herein.

Figure 3:
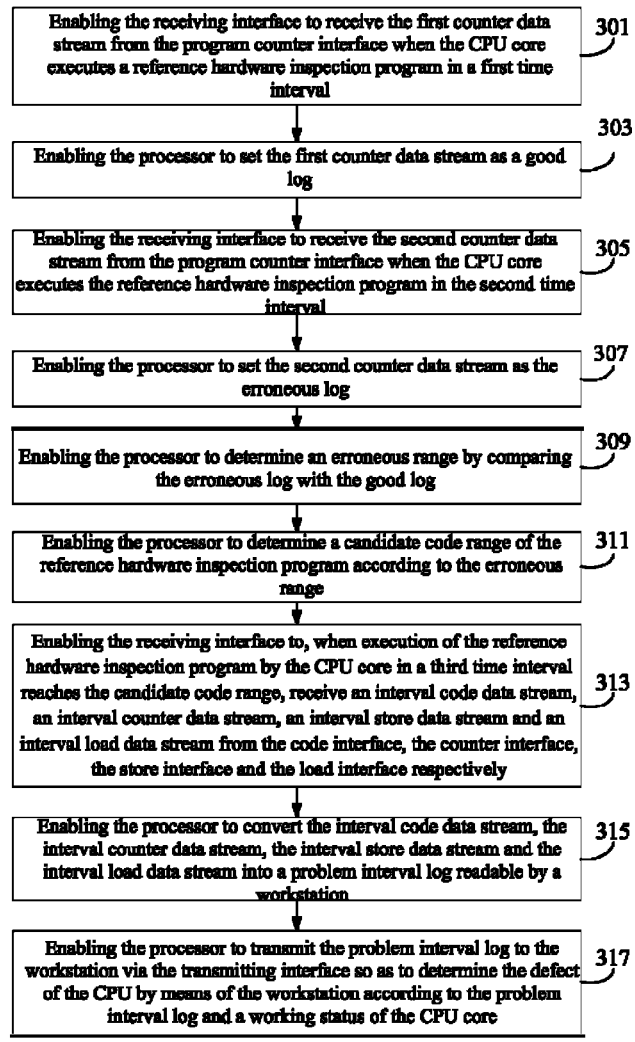
FIG. 3 illustrates a flowchart of a method for an inspection device of the present invention, which is adapted for the inspection device of the second embodiment.

A fourth embodiment of the present invention is a method for inspecting a CPU, a flowchart of which is shown in FIG. 3. The method of the fourth embodiment is adapted for the inspection device of the present invention (e.g., the inspection device 11 of the second embodiment). The inspection device comprises a processor, a receiving interface, a dump memory and a transmitting interface. The CPU comprises a CPU core, a cache, an MMU, a code interface, a program counter interface, a store interface, a load interface and a JTAG interface. The CPU is electrically connected to a DRAM, a dump memory and a hard disk.

Initially, step 301 is executed to enable the receiving interface to receive the first counter data stream from the program counter interface when the CPU core executes a reference hardware inspection program in a first time interval. Then, step 303 is executed to enable the processor to store the first counter data stream into a storage device and, after the CPU core has completed execution of the reference hardware inspection program, determine that an error message is not generated by the CPU as a result of the execution of the reference hardware inspection program and set the first counter data stream as the good log. Next, step 305 is executed to enable the receiving interface to receive the second counter data stream from the program counter interface when the CPU core executes the reference hardware inspection program in the second time interval. Afterwards, step 307 is executed to enable the processor to store the second counter data stream into the storage device and, while the CPU core is executing the reference hardware inspection program, determine that an error message is generated by the CPU as a result of the execution of the reference hardware inspection program and set the second counter data stream as the erroneous log. The good log is a correct operation log, while the erroneous log is a problem operation log. It shall be appreciated that, the steps 301 and 303 may be swapped with the steps 305 and 307; and depending on whether an error occurs during the execution of the reference hardware inspection program by the CPU, a log corresponding to a case where no error occurs is recorded as a good log, while a log corresponding to a case where an error occurs is recorded as an erroneous log.

Afterwards, step 309 is executed to enable the processor to read the good log and the erroneous log from the storage device, and by comparing the second counter data stream representing the erroneous log with the first counter data stream representing the good log in a sequential manner, determine the segment where the second counter data stream is different from the first counter data stream as the erroneous range. Once the erroneous range is determined, step 311 is executed to enable the processor to determine a candidate code range of the reference hardware inspection program according to the erroneous range.

Then, step 313 is executed to enable the receiving interface to, when execution of the reference hardware inspection program by the CPU core in a third time interval reaches the candidate code range, receive an interval counter data stream, an interval code data stream, an interval store data stream and an interval load data stream from the counter interface, the code interface, the store interface and the load interface respectively. Meanwhile, when the execution of the reference hardware inspection program by the CPU core in the third time interval reaches the candidate code range, the workstation also receives a working status of the CPU core (i.e., a status of the CPU core and a status of registers thereof) via the JTAG interface. Next, step 315 is executed to enable the processor to convert the interval code data stream, the interval counter data stream, the interval store data stream and the interval load data stream into a problem interval log which is readable by a workstation. Finally, step 317 is executed to enable the processor to transmit the problem interval log to the workstation via the transmitting interface so as to determine the defect of the CPU by means of the workstation according to the problem interval log and the working status.

In addition to the aforesaid steps, the method of this embodiment can also execute all the operations and functions set forth in the second embodiment. How the method of this embodiment executes these operations and functions will be readily appreciated by those of ordinary skill in the art based on the explanation of the second embodiment and, thus, will not be further described herein.

It shall be appreciated that, the method of the present invention is not limited to the two implementations of the third and the fourth embodiments described above. The method of the present invention is used to inspect a defect of a CPU. When the CPU executes a reference hardware inspection program in a first time interval, the method of the present invention enables the receiving interface of the inspection device to receive a first data stream from the CPU; and when the CPU executes the reference hardware inspection program in a second time interval, the method of the present invention enables the receiving interface of the inspection device to receive a second data stream from the CPU. Then, the method of the present invention enables the processor of the inspection device to set the first data stream as a good log, set the second data stream as an erroneous log, determine a segment of the erroneous log as an erroneous range by comparing the good log with the erroneous log, and determine a defect of the CPU according to the erroneous range. When it is desired to test different kinds of defects of the CPU, the method of the present invention enables the receiving interface of the inspection device to receive the first and the second data streams of different kinds from different interfaces of the CPU.

According to the above descriptions, the method of the present invention enables the CPU to repeatedly execute a reference hardware inspection program to generate a good log and an erroneous log, then detects an erroneous range by comparing the good log with the erroneous log, and finally converts the erroneous range into a problem interval log which is readable by a workstation (i.e., an environment of an EDA tool) so that the workstation can simulate an operation status of the CPU within the erroneous range. Hence, the inspection device of the present invention can effectively solve the problem of the prior art that a defect of the CPU must be detected by using expensive hardware facilities to directly access the CPU and the problem of the prior art that it is impossible to use a workstation to simulate a status of the CPU which is running the whole operating system. Briefly speaking, according to the present invention, an erroneous range of the CPU is preliminarily determined by means of only the reference hardware inspection program and the basic computer connection interfaces; and then, by further analyzing the erroneous range, a defect of the CPU can be determined. As a result, the present invention can efficiently lower the complexity of detecting a defect of a CPU, thereby reducing both the time and the cost required to detect the defect of the CPU.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for inspecting a central processing unit (CPU), the method being adapted for use in an inspection device, the inspection device being electrically connected to the CPU and comprising a receiving interface and a processor, the method comprising the following steps of:
   (a) enabling the receiving interface to receive a first data stream from the CPU when the CPU executes a reference hardware inspection program in a first time interval;
   (b) enabling the processor to set the first data stream as a good log;
   (c) enabling the receiving interface to receive a second data stream from the CPU when the CPU executes the reference hardware inspection program in a second time interval;
   (d) enabling the processor to set the second data stream as an erroneous log;
   (e) enabling the processor to compare the good log with the erroneous log to determine a segment of the erroneous log as an erroneous range; and
   (f) enabling the processor to determine a defect of the CPU according to the erroneous range;
   wherein the CPU comprises a CPU core, a cache, a memory management unit (MMU) and a code interface, the CPU is electrically connected to a dynamic random access memory (DRAM) and a hard disk, the reference hardware inspection program is stored in the hard disk, the CPU core is configured to load the reference hardware inspection program into the cache and the DRAM to execute the reference hardware inspection program, the MMU is configured to record an address mapping relationship of the reference hardware inspection program among the cache, the DRAM and the hard disk, the erroneous range is a linear address range, the first data stream comprises a first code data stream, the second data stream comprises a second code data stream, the step (a) is to enable the receiving interface to receive the first code data stream from the code interface, and the step (c) is to enable the receiving interface to receive the second code data stream from the code interface.

2. The method as claimed in claim 1, wherein the step (b) comprises the following steps of:
   (b1) enabling the processor to store the first code data stream into a storage device;
   (b2) enabling the processor to, after the CPU core has executed the reference hardware inspection program in the first time interval, determine that an error message is not generated as a result of the execution of the reference hardware inspection program by the CPU; and
   (b3) enabling the processor to set the first code data stream as the good log according to the result of the step (b2); and
   the step (d) comprises the following steps of:
   (d1) enabling the processor to store the second code data stream into the storage device;
   (d2) enabling the processor to, when the CPU core is executing the reference hardware inspection program in the second time interval, determine that the error message is generated as a result of the execution of the reference hardware inspection program by the CPU; and
   (d3) enabling the processor to set the second code data stream as the erroneous log according to the result of the step (d2).

3. The method as claimed in claim 2, wherein the step (e) comprises the following steps of:
   (e1) enabling the processor to read the good log and the erroneous log from the storage device; and
   (e2) enabling the processor to compare the second code data stream with the first code data stream to determine the segment where the second code data stream is different from the first code data stream as the erroneous range.

4. The method as claimed in claim 3, wherein the inspection device further comprises a dump memory and a transmitting interface, the dump memory is electrically connected to the processor and the receiving interface, the CPU further comprises a program counter interface, a store interface, a load interface and a Joint Test Action Group (JTAG) interface, the JTAG interface is connected to a workstation, and the step (f) comprises the following steps of:
   (f1) enabling the processor to determine a candidate code range of the reference hardware inspection program according to the erroneous range, wherein the candidate code range defines a plurality of codes for accessing a plurality of linear addresses of the hard disk;

(f2) enabling the receiving interface to, when the CPU core executes the reference hardware inspection program in a third time interval, receive a plurality of data stored in the plurality of linear addresses of the hard disk;

(f3) enabling the receiving interface to store the plurality of data received into the dump memory;

(f4) enabling the processor to, when the CPU core executes one of the plurality of codes again to access a candidate linear address, retrieve a first predetermined portion of the data corresponding to the candidate linear address from the cache as a first data, wherein the candidate linear address is one of the plurality of linear addresses;

(f5) enabling the processor to, after the step (f4), retrieve a second predetermined portion of the data corresponding to the candidate linear address from the dump memory as a second data;

(f6) enabling the processor to determine that the first data and the second data are different from each other;

(f7) enabling the processor to determine that the code for accessing the candidate linear address is related to the defect of the CPU according to the result of the step (f6);

(f8) enabling the receiving interface to, when the execution of the reference hardware inspection program by the CPU core in a fourth time interval reaches the candidate code range, receive an interval code data stream, an interval counter data stream, an interval store data stream and an interval load data stream from the code interface, the counter interface, the store interface and the load interface respectively, wherein when the execution of the reference hardware inspection program by the CPU core in the fourth time interval reaches the candidate code range, the workstation receives a working status of the CPU core through the JTAG interface;

(f9) enabling the processor to, after the step (f8), convert the interval code data stream, the interval counter data stream, the interval store data stream and the interval load data stream into a problem interval log which is readable by a workstation; and (f10) enabling the processor to transmit the problem interval log to the workstation through the transmitting interface, so as to determine the defect of the CPU by means of the workstation according to the problem interval log and the working status.

5. The method as claimed in claim 4, wherein the first predetermined portion is a plurality of bits of the data corresponding to the candidate linear address stored in the cache, the second predetermined portion is a plurality of bits of the data corresponding to the candidate linear address stored in the dump memory, and amounts and positions of the bits of the first predetermined portion and the second predetermined portion are the same.

6. The method as claimed in claim 4, wherein the first predetermined portion is a whole of the data corresponding to the candidate linear address stored in the cache, and the second predetermined portion is a whole of the data corresponding to the candidate linear address stored in the dump memory.

7. The method as claimed in claim 4, wherein the CPU core has a plurality of registers, and the working status of the CPU refers to a status of the CPU core and a status of each of the plurality of registers.

8. The method as claimed in claim 4, wherein the workstation is an environment for implementing an electronic design automation (EDA) tool, and the CPU is an environment of a field-programmable gate array (FPGA).

9. A method for inspecting a central processing unit (CPU), the method being adapted for use in an inspection device, the inspection device being electrically connected to the CPU and comprising a receiving interface and a processor, the method comprising the following steps of:

(a) enabling the receiving interface to receive a first data stream from the CPU when the CPU executes a reference hardware inspection program in a first time interval;

(b) enabling the processor to set the first data stream as a good log;

(c) enabling the receiving interface to receive a second data stream from the CPU when the CPU executes the reference hardware inspection program in a second time interval;

(d) enabling the processor to set the second data stream as an erroneous log;

(e) enabling the processor to compare the good log with the erroneous log to determine a segment of the erroneous log as an erroneous range; and (f) enabling the processor to determine a defect of the CPU according to the erroneous range;

wherein the CPU comprises a CPU core and a program counter interface, the first data stream comprises a first counter data stream, the second data stream comprises a second counter data stream, the step (a) is to enable the receiving interface to receive the first counter data stream from the program counter interface, and the step (c) is to enable the receiving interface to receive the second counter data stream from the program counter interface.

10. The method as claimed in claim 9, wherein the step (b) comprises the following steps of:

(b1) enabling the processor to store the first counter data stream into a storage device;

(b2) enabling the processor to, after the CPU has executed the reference hardware inspection program in the first time interval, determine that an error message is not generated as a result of the execution of the reference hardware inspection program by the CPU; and (b3) enabling the processor to set the first counter data stream as the good log according to the result of the step (b2); and the step (d) comprises the following steps of:

(d1) enabling the processor to store the second counter data stream into the storage device;

(d2) enabling the processor to, when the CPU is executing the reference hardware inspection program in the second time interval, determine that an error message is generated as a result of the execution of the reference hardware inspection program by the CPU; and (d3) enabling the processor to set the second counter data stream as the erroneous log according to the result of the step (d2).

11. The method as claimed in claim 10, wherein the step (e) comprises the following steps of:

(e1) enabling the processor to read the good log and the erroneous log from the storage device; and (e2) enabling the processor to compare the second counter data stream with the first counter data stream to determine the segment where the second counter data stream is different from the first counter data stream as the erroneous range.

12. The method as claimed in claim 11, wherein the inspection device further comprises a transmitting interface, the CPU further comprises a code interface, a store interface, a load interface and a JTAG interface, the JTAG interface is connected to a workstation, and the step (f) comprises the following steps of:

(f1) enabling the processor to determine a candidate code range of the reference hardware inspection program according to the erroneous range;

(f2) enabling the receiving interface to, when the execution of the reference hardware inspection program by the CPU core in a third time interval reaches the candidate code range, receive an interval counter data stream, an interval code data stream, an interval store data stream and an interval load data stream from the counter interface, the code interface, the store interface and the load interface respectively, wherein the workstation receives a working status of the CPU core through the JTAG interface in the third time interval;

(f3) enabling the processor to convert the interval counter data stream, the interval code data stream, the interval store data stream and the interval load data stream into a problem interval log which is readable by a workstation; and (f4) enabling the processor to transmit the problem interval log to the workstation through the transmitting interface so as to determine the defect of the CPU by means of the workstation according to the problem interval log and the working status.

13. The method as claimed in claim 12, wherein the CPU core has a plurality of registers, and the working status of the CPU refers to a status of the CPU core and a status of each of the registers.

14. The method as claimed in claim 12, wherein the workstation is an environment for implementing an EDA tool, and the CPU is an environment of an FPGA.

15. A device for use in inspecting a CPU, the device being electrically connected to the CPU and comprising:

a receiving interface, being configured to receive a first data stream from the CPU when the CPU executes a reference hardware inspection program in a first time interval and receive a second data stream from the CPU when the CPU executes the reference hardware inspection program in a second time interval; and a processor, being configured to set the first data stream as a good log, set the second data stream as an erroneous log, compare the good log with the erroneous log to determine a segment of the erroneous log as an erroneous range and determine a defect of the CPU according to the erroneous range;

wherein the CPU comprises a CPU core, a cache, an MMU and a code interface, the CPU is electrically connected to a DRAM and a hard disk, the reference hardware inspection program is stored in the hard disk, the CPU core is configured to load the reference hardware inspection program into the cache and the DRAM to execute the reference hardware inspection program, the MMU is configured to record an address mapping relationship of the reference hardware inspection program among the cache, the DRAM and the hard disk, the erroneous range is a linear address range, the first data stream comprises a first code data stream, the second data stream comprises a second code data stream, and the receiving interface is configured to receive the first code data stream and the second code data stream from the code interface of the CPU.

16. The device as claimed in claim 15, wherein the processor is further configured to:

store the first code data stream into a storage device, after the CPU core has executed the reference hardware inspection program in the first time interval, determine that an error message is not generated as a result of the execution of the reference hardware inspection program by the CPU, set the first code data stream as the good log according to the determination result that a error message is not generated as a result of the execution of the reference hardware inspection program in the first time interval, store the second code data stream into the storage device, when the CPU is executing the reference hardware inspection program in the second time interval, determine that the error message is generated as a result of the execution of the reference hardware inspection program by the CPU, and set the second code data stream as the erroneous log according to the determination result that the error message is generated as a result of the execution of the reference hardware inspection program in the second time interval.

17. The device as claimed in claim 16, wherein the processor is further configured to read the good log and the erroneous log from the storage device, and compare the second code data stream with the first code data stream to determine the segment where the second code data stream is different from the first code data stream as the erroneous range.

18. The device as claimed in claim 17, wherein the device further comprises a dump memory and a transmitting interface, the dump memory is electrically connected to the processor and the receiving interface, the CPU further comprises a program counter interface, a store interface, a load interface and a JTAG interface, the JTAG interface is connected to a workstation, and the device is further configured to execute the following operations:

the processor is further configured to determine a candidate code range of the reference hardware inspection program according to the erroneous range, wherein the candidate code range defines a plurality of codes for accessing a plurality of linear addresses of the hard disk, the receiving interface is further configured to, when the CPU core executes the reference hardware inspection program in a third time interval, receive a plurality of data stored in the plurality of linear addresses of the hard disk, the receiving interface is further configured to store the plurality of data received into the dump memory, the processor is further configured to, when the CPU core executes one of the plurality of codes again to access a candidate linear address, retrieve a first predetermined portion of the data corresponding to the candidate linear address from the cache as a first data, wherein the candidate linear address is one of the plurality of linear addresses, the processor is further configured to retrieve a second predetermined portion of the data corresponding to the candidate linear address from the dump memory as a second data, the processor is further configured to determine that the first data and the second data are different from each other, and determine that the code for accessing the candidate linear address is related to the defect of the CPU according to the determination result that the first data and the second data are different from each other, the receiving interface is further configured to, when the execution of the reference hardware inspection program by the CPU core in a fourth time interval reaches the candidate code range, receive an interval code data stream, an interval counter data stream, an interval store data stream and an interval load data stream from the code interface, the counter interface, the store interface and the load interface respectively, wherein the workstation receives a working status of the CPU core through the JTAG interface in the fourth time interval, the processor is further configured to convert the interval code data stream, the interval counter data stream, the interval store data stream and the interval load data stream into a problem interval log which is readable by a workstation, and the processor is further configured to transmit the problem interval log to the workstation through the transmitting interface so as to determine the defect of the CPU by means of the workstation according to the problem interval log and the working status.

19. The device as claimed in claim 18, wherein the CPU core has a plurality of registers, and the working status of the CPU refers to a status of the CPU core and a status of each of the plurality of registers.

20. The device as claimed in claim 18, wherein the workstation is an environment for implementing an EDA tool, and the CPU is an environment of an FPGA.

21. The device as claimed in claim 18, wherein the first predetermined portion is a plurality of bits of the data corresponding to the candidate linear address stored in the cache, the second predetermined portion is a plurality of bits of the data corresponding to the candidate linear address stored in the dump memory, and amounts and positions of the bits of the first predetermined portion and the second predetermined portion are the same.

22. The device as claimed in claim 18, wherein the first predetermined portion is a whole of the data corresponding to the candidate linear address stored in the cache, and the second predetermined portion is a whole of the data corresponding to the candidate linear address stored in the dump memory.

23. A device for use in inspecting a CPU, the device being electrically connected to the CPU and comprising:

a receiving interface, being configured to receive a first data stream from the CPU when the CPU executes a reference hardware inspection program in a first time interval and receive a second data stream from the CPU when the CPU executes the reference hardware inspection program in a second time interval; and a processor, being configured to set the first data stream as a good log, set the second data stream as an erroneous log, compare the good log with the erroneous log to determine a segment of the erroneous log as an erroneous range and determine a defect of the CPU according to the erroneous range;

wherein the CPU comprises a CPU core and a program counter interface, the first data stream comprises a first counter data stream, the second data stream comprises a second counter data stream, and the receiving interface is configured to receive the first counter data stream and the second counter data stream from the program counter interface.

24. The device as claimed in claim 23, wherein the processor is further configured to:

store the first counter data stream into a storage device, after the CPU core has executed the reference hardware inspection program in the first time interval, determine that an error message is not generated as a result of the execution of the reference hardware inspection program by the CPU, set the first counter data stream as the good log according to the determination result that the error message is not generated as a result of the execution of the reference hardware inspection program in the first time interval, store the second counter data stream into the storage device, when the CPU core is executing the reference hardware inspection program in the second time interval, determine that the error message is generated as a result of the execution of the reference hardware inspection program by the CPU, and set the second counter data stream as the erroneous log according to the determination result that the error message is generated as a result of the execution of the reference hardware inspection program in the second time interval.

25. The device as claimed in claim 24, wherein the processor is further configured to read the good log and the erroneous log from the storage device, and compare the second counter data stream with the first counter data stream to determine the segment where the second counter data stream is different from the first counter data stream as the erroneous range.

26. The device as claimed in claim 25, wherein the device further comprises a transmitting interface, the CPU further comprises a code interface, a store interface, a load interface and a JTAG interface, the JTAG interface is connected to a workstation, the processor is further configured to determine a candidate code range of the reference hardware inspection program according to the erroneous range, the receiving interface is further configured to, when the execution of the reference hardware inspection program by the CPU core in a third time interval reaches the candidate code range, receive an interval counter data stream, an interval code data stream, an interval store data stream and an interval load data stream from the counter interface, the code interface, the store interface and the load interface respectively, the workstation receives a working status of the CPU core through the JTAG interface in the third time interval, the processor is further configured to convert the interval counter data stream, the interval code data stream, the interval store data stream and the interval load data stream into a problem interval log which is readable by a workstation, and transmit the problem interval log to the workstation through the transmitting interface so as to determine the defect of the CPU by means of the workstation according to the problem interval log and the working status.

27. The device as claimed in claim 26, wherein the CPU core has a plurality of registers, and the working status of the CPU refers to a status of the CPU core and a status of each of the registers.

28. The device as claimed in claim 26, wherein the workstation is an environment for implementing an EDA tool, and the CPU is an environment of an FPGA.

* * * * *